(12) United States Patent
Avivi (10) Patent No.: US 7,729,272 B2
(45) Date of Patent: Jun. 1, 2010

(54) DETERMINING WHETHER A TRANSMISSION SIGNAL BLOCK WAS FULLY TRANSMITTED BASED ON BIT ERROR PROBABILITY

(75) Inventor: Rotem Avivi, Petah-Tikwa (IL)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/458,349

(22) Filed: Jul. 18, 2006

(65) Prior Publication Data

US 2008/0019326 A1 Jan. 24, 2008

(51) Int. Cl.
*H04J 1/16* (2006.01)

(52) U.S. Cl. ............... 370/252; 455/67.11; 714/762

(58) Field of Classification Search ........... 370/252; 455/102; 714/762
See application file for complete search history.

(56) References Cited

U.S. PATENT DOCUMENTS 3,988,677 A * 10/1976 Fletcher et al. ............. 714/756
6,775,521 B1 * 8/2004 Chen ..................... 455/67.11
6,832,195 B2 12/2004 Johnson
2003/0067883 A1 * 4/2003 Azenkot et al. ............ 370/252

OTHER PUBLICATIONS

Cornu et al., "ETSI AMR-2 VAD: Evaluation and Ultra Low-Resource Implementation," IEEE, Published in the 2003 International Conference on Acoustics Speech and Signal Processing (ICASSP'03) Apr. 6-10, 2003, Hong Kong, China.

* cited by examiner

*Primary Examiner*—Seema S Rao
*Assistant Examiner*—Wanda Z Russell
(74) *Attorney, Agent, or Firm*—Schwabe, Williamson & Wyatt, P.C.

(57) ABSTRACT

Methods, apparatuses, and systems to determine whether a transmission signal block was fully transmitted are described herein. The determination may be made at least in part by calculating one or more bit error probabilities for one or more to be transmitted bursts of the transmission signal block.

22 Claims, 7 Drawing Sheets

DETERMINING WHETHER A TRANSMISSION SIGNAL BLOCK WAS FULLY TRANSMITTED BASED ON BIT ERROR PROBABILITY

TECHNICAL FIELD

Embodiments of the present invention relate to the field of electronic communication, more specifically, to communication within wireless networks.

BACKGROUND

In some types of wireless networks, a base station (BS) may communicate with mobile stations (MSs) by transmitting radio blocks (herein "transmission signal blocks") to the mobile stations. Such transmission signal blocks are typically made up of 19, 22, or some other number of bursts. An example of such a network is a network in which network nodes communicate in compliance with a standard such as Global System for Mobile Communications (GSM) standards (phase I originally published 1990, note that GSM standards includes many standards that are continuously evolving) or with Enhanced Data Rates for GSM Evolution (EDGE/EGPRS) standard including release 99 (from march 2000) and later 3G releases (e.g., rel-99, rel-4, rel-5, rel-6, rel-7, and so forth).

When a base station communicates with mobile stations of such networks, the base station prior to transmitting signals containing the transmission signal blocks may perform a number of operations. Such operations may include, for example, reordering, encoding, ciphering, puncturing, and interleaving the transmission signal blocks prior to transmitting the signals that will contain such blocks.

Correspondingly, when the mobile stations receive the transmission signal blocks, several operations may be performed by the mobile stations. These operations include, for example, equalizing, de-interleaving, de-ciphering, de-puncturing, and de-coding the received transmission signal blocks. In addition, other operations may also be additionally performed at the mobile station in order to, for example, support communication between the mobile stations and the base station. For example, in GSM networks, mobile stations are typically required to report back to the base station on a regular basis bit error probability (BEP) data calculated from BEP measurements of the transmission signal blocks received from the base station to be used for link adaptation (i.e., to change the modulation coding scheme). Generally, it might be required that the BEP data to be transmitted back to the base station will be based only on fully transmitted transmission signal blocks. Note that in the general case, the terminology "fully transmitted" is equivalent to "fully received." From this standpoint, "fully transmitted" terminology will be used throughout the following description to also mean "fully received" unless otherwise indicated.

There are, however, situations where mobile stations may receive transmission signal blocks that were not fully transmitted by the base station. For example, in some circumstances, a base station will go into a discontinuous transmit (DTX) mode in which the base station stops transmitting a transmission signal block sometime during the 19 (or 22) burst period of the transmission signal block (e.g., when someone stops talking and there is no more audio signal to transmit).

Consequently, in order to avoid reporting BEP data that may have been calculated at least in part from the BEP measurement of a transmission signal block that was not fully transmitted by the base station, a mobile station will typically determine the average Signal-To-Interference Noise Ratio (SINR) of a subset of bursts (typically the last two or four bursts) of a transmission signal block to determine whether the transmission signal block was fully transmitted. However, such an approach may not always be an accurate way of determining whether a radio block was fully transmitted. For example, in a synchronized network, if another base station is operating using the same training sequence as the base station of the network, then an average SINR determination of a not fully transmitted radio block may indicate that it was fully transmitted when in fact it was not. This is because SINR only looks at the training sequence of a burst, and since two non neighbor base stations can be using the same training sequence, a false indication of a fully transmitted radio block can result using SINR analysis.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "at least one of A, B and C" means "(A), (B), (C), (A and B), (A and C), (B and C) or (A, B and C)." For the purposes of the present invention, the phrase "(A)B" means "(B) or (AB)," that is, A is an optional element. The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiments of the present invention, methods, apparatuses, and systems are provided that allows a first device of a wireless network to determine whether a transmission signal block has been fully transmitted by a second device of the wireless network. In some embodiments, the first and the second device may be a mobile station and a base station, respectively, of the wireless network. Embodiments of the present invention may provide for the first device to receive a plurality of bursts of a transmission signal block during a plurality of time increments, if the plurality of bursts are correspondingly transmitted during the plurality of time increments from the second device. That is, under some circumstances such as when the second device (e.g., base station) goes into a DTX mode during the transmission of the transmission signal block, one, some, or all of the plurality of bursts of the transmission signal block may not actually be transmitted to the first device (e.g., mobile station).

Regardless of whether the first device actually receives all, some, or no bursts of the transmission signal block, the first device may calculate one or more bit error probabilities (BEPs) for the last n bursts to be transmitted in the last n corresponding time increments, wherein n is an integer. The first device may then determine whether the transmission signal block was fully transmitted by the second device based at least in part on the results of the calculation. In accordance with various embodiments of the present invention, by correctly determining whether the transmission signal block was fully transmitted, subsequent processes may be better facilitated. These and other aspects of various embodiments of the present invention will be described in greater detail below.

Figure 1:
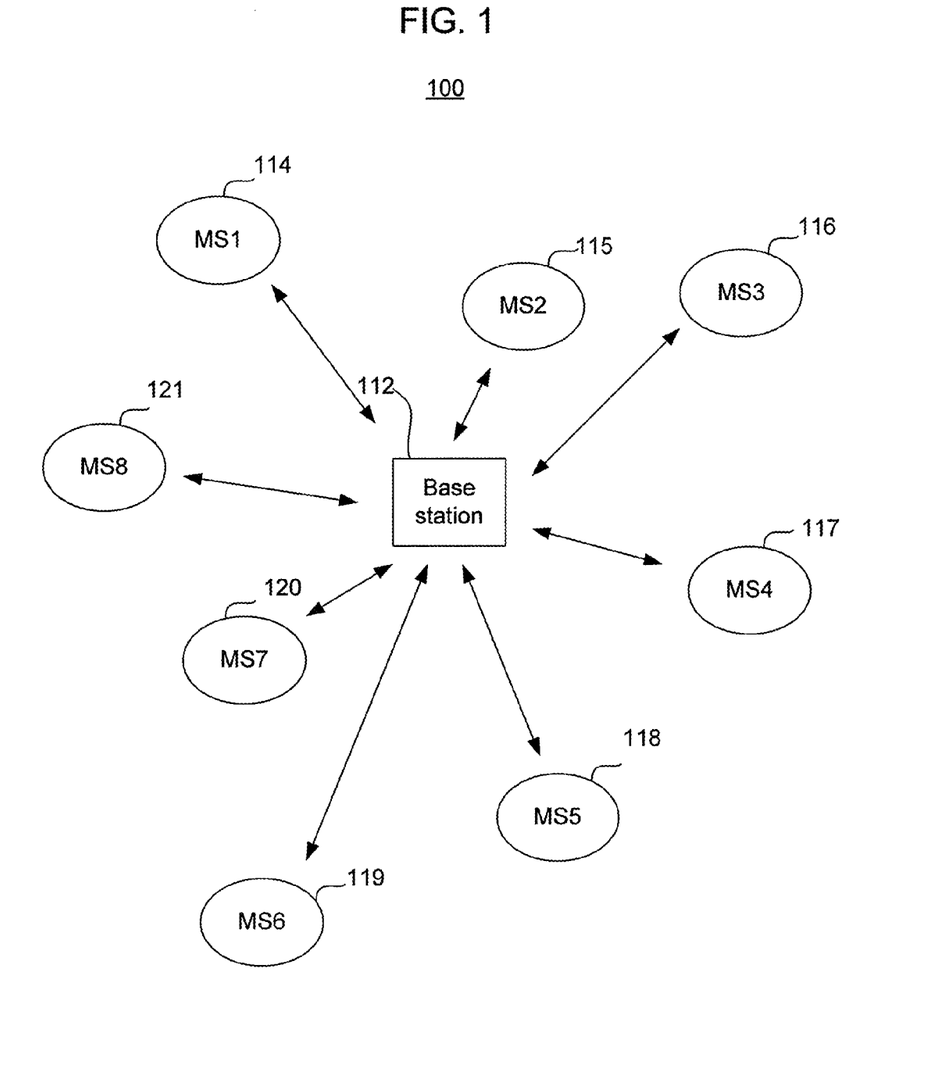
FIG. 1 illustrates a wireless network in accordance with various embodiments of the present invention.

FIG. 1 illustrates a wireless network in accordance with various embodiments of the present invention. For the embodiments, the wireless network 100 may include nodes that communicate within the network 100 in accordance with a standard such as a GSM or an EDGE/EGPRS standard. As depicted, the network 100 includes a base station 112 that may bi-directionally communicate with multiple mobile stations 114 to 121. In some embodiments, signals containing transmission signal blocks may be transmitted between the base station 112 and the mobile stations 114 to 121 in accordance with time division multiple access (TDMA). In the following description, the phrases "transmission signal block" and "block" are used interchangeably, and are therefore, synonymous, unless the context indicates otherwise. Note that in alternative embodiments, more or fewer mobile stations may be included in the network 100 than the eight mobile stations 114 to 121 depicted. The mobile stations 114 to 121 may have various form factors including, for example, cellular telephones, personal digital assistant (PDA), computing tablets, laptops, and so forth. For ease of understanding, the following description of embodiments of the present invention will generally be described from the perspective of mobile station 114 communicating with the base station 112.

Figure 2:
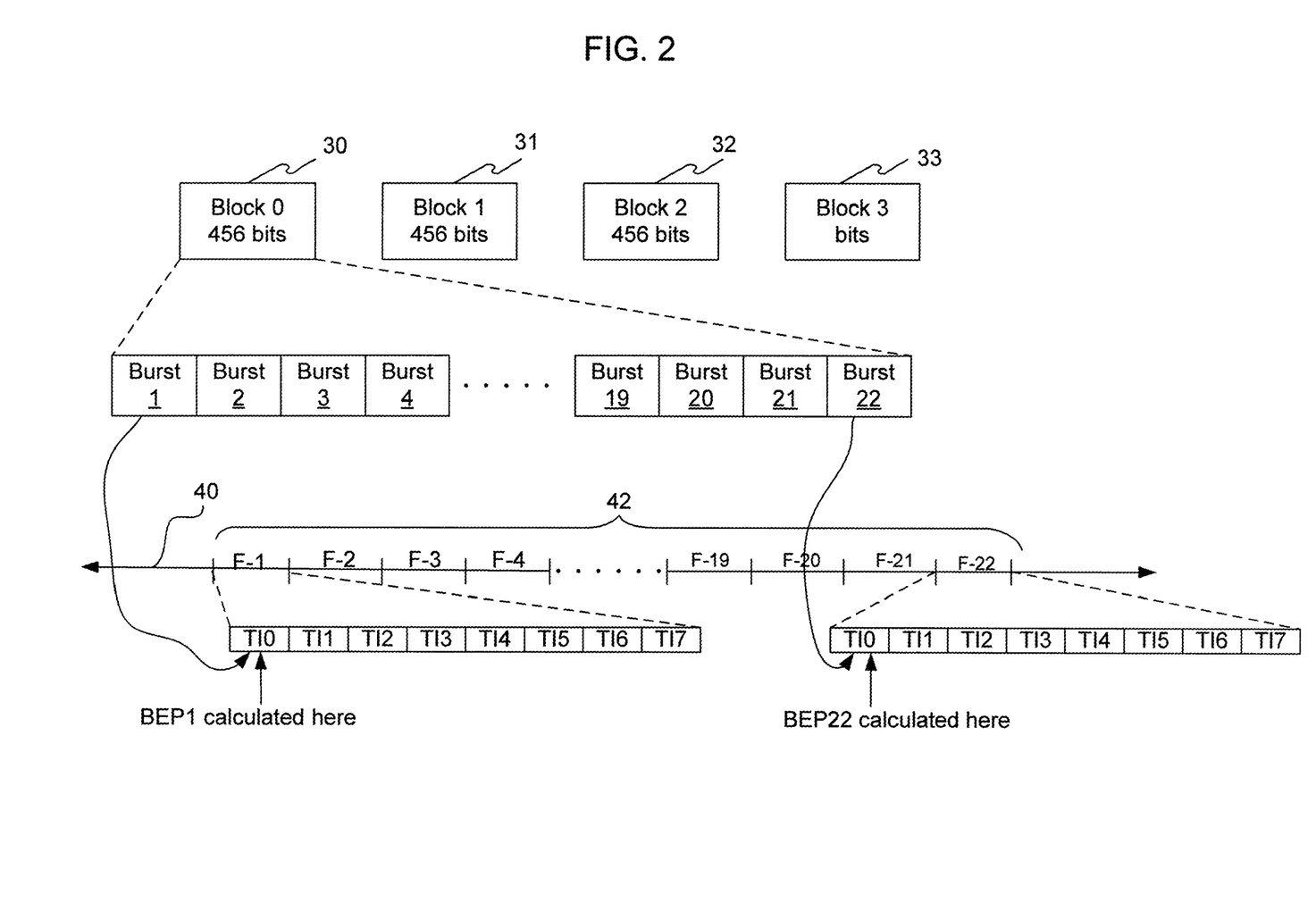
FIG. 2 illustrates transmission signal blocks in accordance with various embodiments of the present invention.

FIG. 2 illustrates transmission signal blocks transmitted in a wireless network in accordance with various embodiments of the present invention. For the embodiments, the transmission signal blocks 30 to 33 may be transmitted by the base station 112 and may be received by the mobile station 114 of the wireless network 100. As illustrated, four blocks 30 to 33 are depicted that may each contain 456 bits. In some embodiments, the blocks 30 to 33 may be generated periodically, for example, every 20 ms period. Alternatively, each of the blocks 30 to 33 may each be generated at time periods less than or greater than 20 ms and/or include other number of bits. The bits included in the blocks 30 to 33 may be encoded, enciphered, and interleaved by the transmitting device (i.e., base station 112). As depicted, block 30 may be spread over 22 bursts, although in alternative embodiments, the block 30 may be spread over 19 or some other number of bursts.

In some embodiments, and as a result of interleaving, the distribution of the 456 encoded bits of block 30 may be as follows:
Bursts 1 and 22=6 bits each
Bursts 2 and 21=12 bits each
Bursts 3 and 20=18 bits each
The other 16 bursts=24 bits each Notice that if, for example, the last four burst are not transmitted (due to DTX), only 60 bits out of 456 bits are not transmitted. Thus, due to the code redundancy, this block could be successfully decoded even though the last four bursts (60 bits) were actually not transmitted.

The 22 bursts of block 30 may be transmitted by the base station 112 and received by a mobile station 114 during a time interval 42 along a timeline 40 as further illustrated in FIG. 2. In particular, time interval 42 corresponds to the time interval when all of the 22 bursts of block 30, bursts 1 to 22, are received by the mobile station 114. As illustrated, the time interval 42 may be divided into 22 time frames (F-1 to F-22) that may correspond to TDMA frames, each time frame (F-1 to F-22) being further segmented into eight time slots or time increments (i.e., TI0 to TI7), herein "time increments." Each of the time increments (TI0 to TI7) for each time frame (F-1 to F-22) may be associated with a different network user (i.e., mobile stations 114 to 121) allowing the base station 112 to communicate concurrently with eight different users (i.e., mobile stations 114 to 121). Accordingly, only the first time increment (i.e., TI0) of each time frame (F-1 to F-22) will be for mobile station 114. Note that in alternative embodiments, the time frames (F-1 to F-22) may be segmented into fewer or more time increments than the eight time increments depicted. In still other alternative embodiments, multi-slots (i.e., where multiple time increments can be allocated to one mobile station) or shared slots (i.e., where one time increment could be shared by multiple mobile stations) may be employed thus resulting in more or fewer users being able to communicate at give time.

In essence, the time interval 40 is divided into multiple time increments, only some of which are for the base station 112 to transmit the bursts (i.e., bursts 1 to 22) of block 30 to the mobile station 114. For example, if block 30 is a fully transmitted transmission signal block (i.e. bursts 1 to 22 are each actually transmitted by the base station 12), then burst 1 of block 30 may be received by mobile station 114 during the first time increment (TI0) of the first time frame (F-1) while the last burst, burst 22, may be received by mobile station 114 during the first time increment (TI0) of the last time frame (F-22).

According to various embodiments of the present invention, when the mobile station 114 is initially powered on or initially enters the network 100, there may be an initial synchronization process in which the mobile station 114 synchronized on the frames timing. After that, the mobile station 114 may acquire information periodically from, for example, the base station 112 regarding its multiframe structure (e.g., a group of 26, 52 or 51 frames). As a result, the mobile station 114 may "know" exactly when a transmission signal block is suppose to start and when it is suppose to end. In particular, the mobile station 114 may know exactly when it should be expected to receive each burst of a transmission signal block.

As a result, for BEP calculations of block 30, which in some prior art embodiments, may be performed for each burst (i.e., bursts 1 to 22) of block 30 as they are received, the BEP calculations may be performed for each time increment (i.e., the first time increment TI0 of each time frame F-1 to F-22) that corresponds to each burst (i.e., bursts 1 to 22) of block 30. However, as will be described in more detail below, in various embodiments of the invention, when block 30 is not a fully transmitted transmission signal block (e.g., when the base station 112 goes into DTX mode while transmitting block 30), one or more of the bursts (i.e., bursts 1 to 22) of block 30 may not be transmitted by the base station 112, and the BEP of that block should be ignored (e.g. as part of the BEP reporting process back to the base-station). In various embodiments, BEP calculations are first performed for the last n bursts to be transmitted in the last n time increments to determine if they were transmitted. Only on determination that the entire transmission block 30 has been transmitted, would the mobile station calculate BEP data of that block and report it back to the base station after long term averaging or use this information for other purposes. The results of the BEP calculations for the non-transmitted bursts will actually be BEP calculations of, for example, mobile-station's thermal noise. Furthermore, note that the corresponding time increments (i.e., the first time increment TI0 for each of the time frames F-1 to F-22) for each of the bursts (bursts 1 to 22) of block 30 are sequentially interspersed or spread along the timeline 40.

Figure 3:
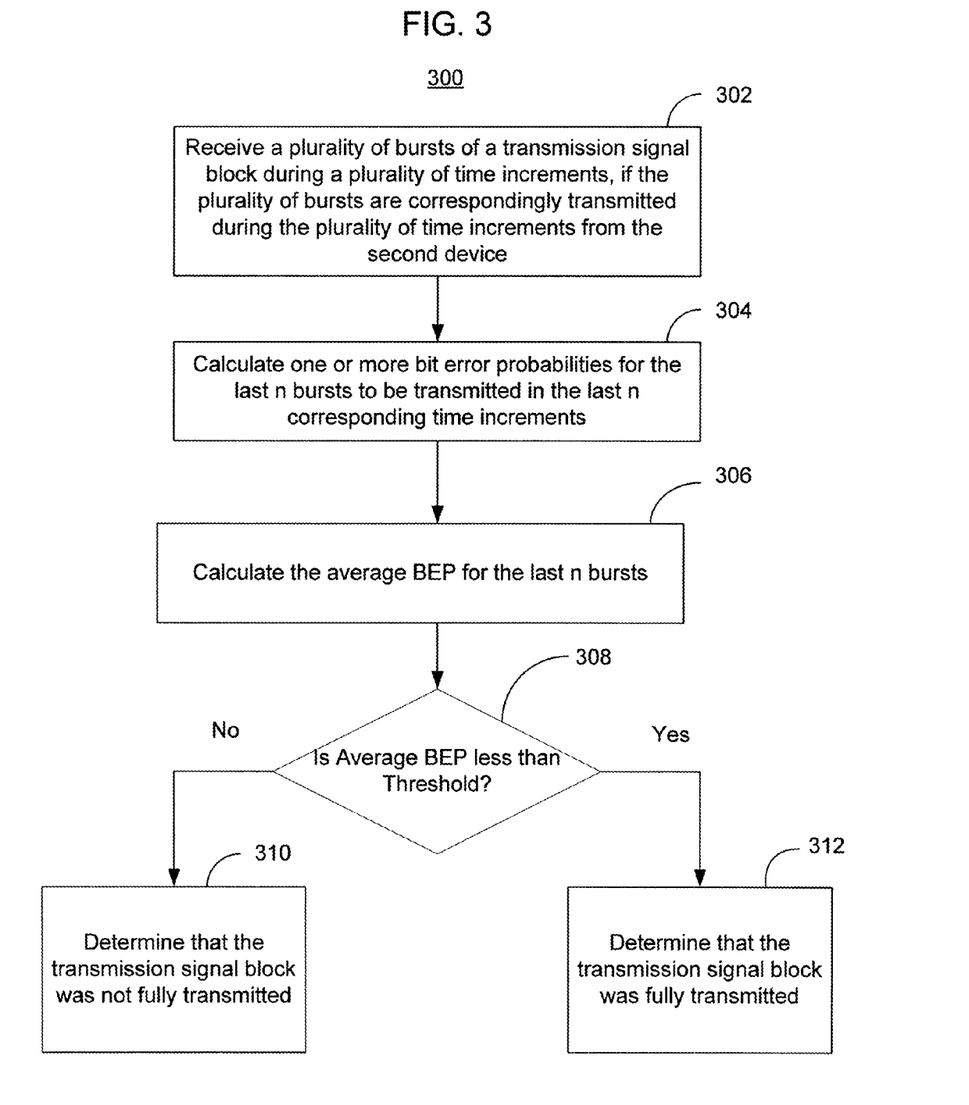
FIG. 3 illustrates a process in accordance with various embodiments of the present invention.

FIG. 3 illustrates a process for determining whether a transmission signal block has been fully transmitted in accordance with various embodiments of the present invention. The process 300 may be implemented by a first device of a wireless network 100 that is to receive a transmission signal block from a second device of the wireless network 100. In some embodiments, the first device may be a mobile station 114 while the second device may be a base station 112. The process 300, in various embodiments, may be for full-rate communication in which each sub-channel is used by a single user on a single time-slot (as opposed to half-rate communication in which two sub-channels are used by two users alternatively on a single time-slot).

The process 300 may begin when the first device receives a plurality of bursts of a transmission signal bursts during a plurality of time increments, if the plurality of bursts are correspondingly transmitted during the plurality of time increments from the second device at 302. That is, because the second device may not have fully transmitted the transmission signal block due to, for example, the second device being in DTX mode, one, some, or all of the plurality of bursts of the transmission signal block may not have been actually transmitted during the plurality of time increments. In some embodiments, the received plurality of bursts may be interleaved, encoded, and/or enciphered bursts. After receiving the plurality of bursts, the plurality of bursts may then be equalized.

After receiving the plurality of bursts and equalizing the received bursts, the first device may then calculate one or more bit error probabilities (BEPs) for the last n bursts to be transmitted in the last n corresponding time increments, where n is an integer, at 304. In some embodiments, n may equal four. Thus, in the previous example illustrated in FIG. 2, BEPs may be calculated for each of the last four bursts, bursts 19 to 22, by calculating BEPs for the last four corresponding time increments (i.e., first time increments TI0 of time frames F-19 to F-22). Note again that in some cases, one or more of the last four bursts, bursts 19 to 22, may not have actually been transmitted in which case the BEPs calculated for the last four bursts 19 to 22 may be the BEPs of thermal noise.

Once the BEPs for the last n bursts have been calculated, an average BEP for the last n bursts may be calculated by the first device by averaging the BEPs calculated for the last n bursts at 306. The average BEP calculated may be compared to a threshold at 308. If the average BEP is greater than the threshold, then the first device determines that transmission signal block has not been fully transmitted at 310. On the other hand, if the average BEP is less than the threshold, then the first device determines that the transmission signal block has been fully transmitted at 312.

According to various embodiments of the present invention, the determination of whether the transmission signal block was or was not fully transmitted may facilitate the proper execution of a subsequent process. For example, if the transmission signal block is determined to have not been fully transmitted by the second device then in some embodiments, BEP measurements of the not fully transmitted transmission signal block may not be used to derive BEP data to be transmitted or reported back to the second device. On the other hand, if the transmission signal block is determined to have been fully transmitted by the second device, then the BEP data to be transmitted back to the second device may be derived at least in part from BEP measurements of the transmission signal block. In some embodiments, this means that the BEP data to be transmitted back to the second device may be derived at least in part from the last k bursts (e.g., last 4 bursts) of the fully transmitted transmission signal block. A more detailed discussion of the BEP data to be transmitted to the second device will be provided below.

Figure 4:
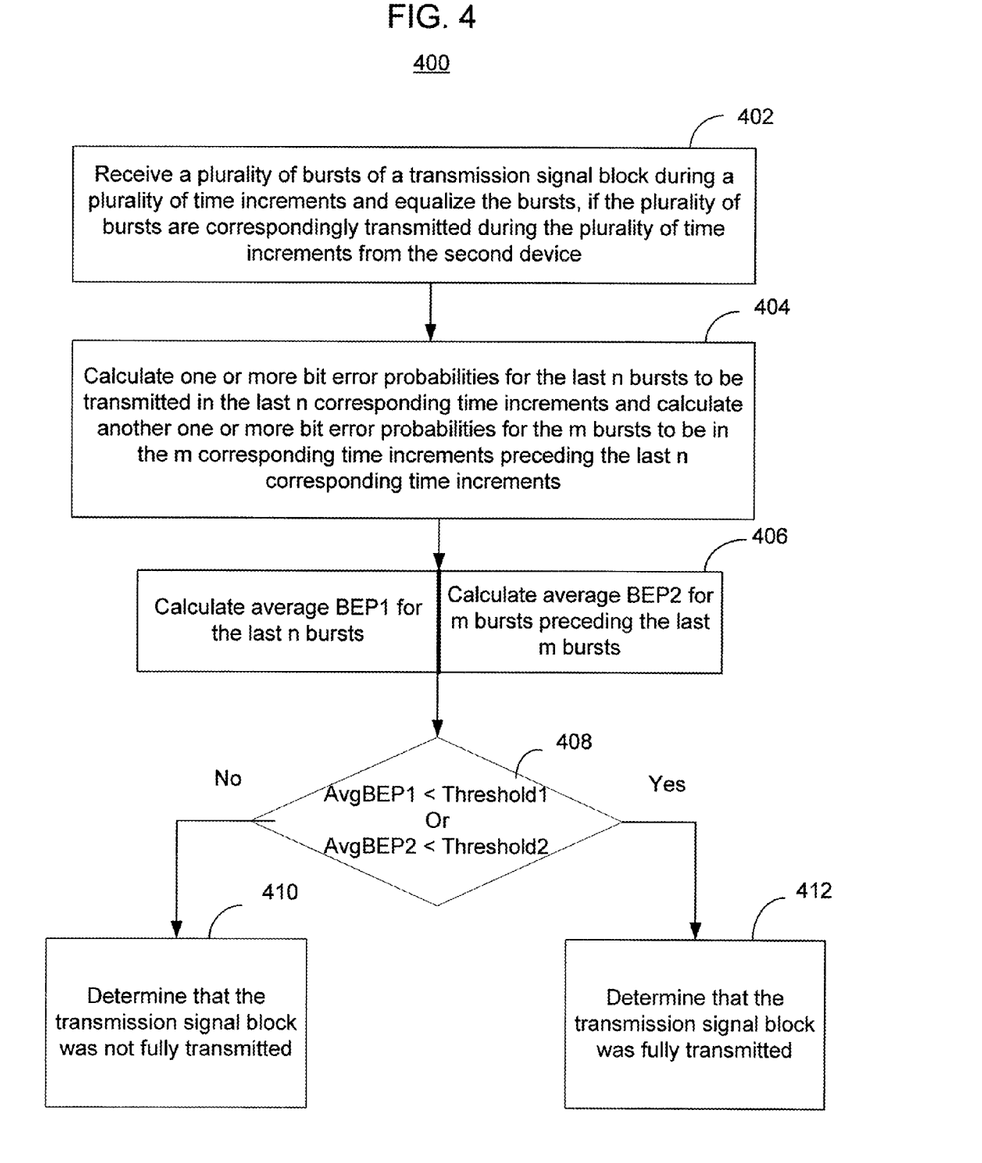
FIG. 4 illustrates another process in accordance with various embodiments of the present invention.

FIG. 4 illustrates another process for determining whether a transmission signal block has been fully transmitted in accordance with various embodiments of the present invention. However, unlike the previous process 300, the process 400 here may be for half-rate communication. In half-rate communication, two sub-channels (instead of one like in full-rate communication) may be employed. For example, two cellular users may use the same time division multiple access (TDMA) time slot in an alternative manner. However, because two sub-channels are being shared by two users on single time-slot, lower speech quality for each user may result due to user being able to only transmit, for example, 228 bits (instead of 456 bits) for each transmission signal block transmitted.

Similar to the process 300 of FIG. 3, the process 400 may be performed by a first device of a wireless network 100 that is to receive a transmission signal block from a second device of the wireless network 100. In some embodiments, the first device may be a mobile station 114 of a wireless network 100 while the second device may be a base station 112 of the wireless network 100.

The process 400 may begin when the first device receives a plurality of bursts of a transmission signal block during a plurality of time increments, if the plurality of bursts are correspondingly transmitted during the plurality of time increments from the second device at 402. In some embodiments, the received plurality of bursts may be enciphered, encoded, and/or interleaved bursts. After receiving the plurality of bursts, the plurality of bursts may then be equalized.

After receiving the plurality of bursts and equalizing the received bursts, the first device may then calculate one or more bit error probabilities (BEPs) for the last n bursts to be transmitted in the last n corresponding time increments and calculate another one or more bit error probabilities for the m bursts to be in the m corresponding time increments preceding the last n corresponding time increments, wherein both n and m are integers, at 404. In some embodiments, n and m may each equal two. Thus, in the example illustrated in FIG. 2, BEPs may be calculated for the last two bursts 21 and 22, and for the two bursts 19 and 20 preceding the last two bursts by first calculating BEPs for the last two corresponding time increments (i.e., first time increments TI0 of time frames F-21 and F-22) and by second calculating BEPs for the two corresponding time increments (i.e., first time increments TI0 of time frames F-19 and F-20) preceding the last two corresponding time increments. Note again that under some circumstances one or more of the bursts, bursts 19 to 22, may not have actually been transmitted in which case the BEPs calculated for the four bursts 19 to 22 may be the BEPs of thermal noise.

Once the BEPs for the last n bursts and the BEPs for the m bursts preceding the last n busts have been calculated, a first average BEP (AvgBEP1) for the last n bursts and a second average BEP (AvgBEP2) may be calculated by the first device by averaging the BEPs calculated for the last n bursts and by averaging the BEPs calculated for the m bursts preceding the last n bursts at 406. The average BEPs calculated may then be compared to a first and a second threshold, respectively, at 408. If the first average BEP or the second average BEP is greater than the first or the second threshold, then the first device determines that transmission signal block has not been fully transmitted at 410. On the other hand, if both the first and the second average BEP is less than the first and the second threshold, then the first device determines that the transmission signal block has been fully transmitted at 412. In various embodiments, the determination of whether a transmission signal block was or was not fully transmitted may facilitate the proper execution of a subsequent process as described previously.

Figure 5:
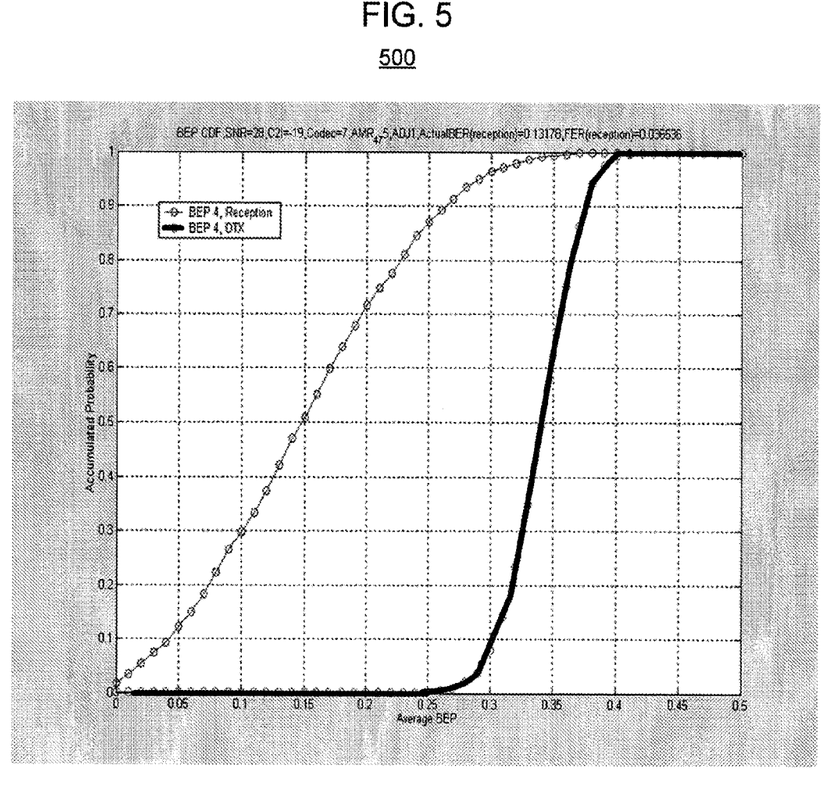
FIG. 5 illustrates a graphical representation of the cumulative density functions (CDF) of BEP measurements under full speech reception and under DTX mode in accordance with various embodiments of the present invention.

In the above process 300 and 400, the average BEPs calculated were compared to one or two thresholds. According to various embodiments of the present invention, the thresholds used in determining whether a transmission signal block has been fully transmitted may be optimally set based on the graph illustrated in FIG. 5. In particular, graph 500 shows the cumulative density functions (CDF) of the average BEP measurements of the last four bursts of a block under full speech reception and under DTX mode. The curve on the left represents the CDF of BEP measurements under full speech reception while the curve on the right represents the CDF of BEP measurements under DTX mode. From graph 500 the thresholds used to determine whether a transmission signal block has been fully transmitted as described above for processes 300 and 400 can be ascertained. That is, based on FIG. 5, such thresholds may set at about 0.25 to about 0.29. In some embodiments of the present invention, the thresholds may have a value of about 0.27.

According to various embodiments of the present invention, BEPs for bursts of a transmission signal block may be calculated using Log Likelihood Ratio (LLR). For BEPs, the LLR may be defined by the following ratio:

$$LLR = \ln \frac{P(X=1|\underline{y})}{P(X=0|\underline{y})}$$

As a result, $$\hat{P}e = \frac{1}{1+e^{|LLR|}} = P(R \neq X|\underline{y})$$

where:
X=The transmitted bit (0 or 1).
R=The equalizer hard decision bit.

Figure 6:
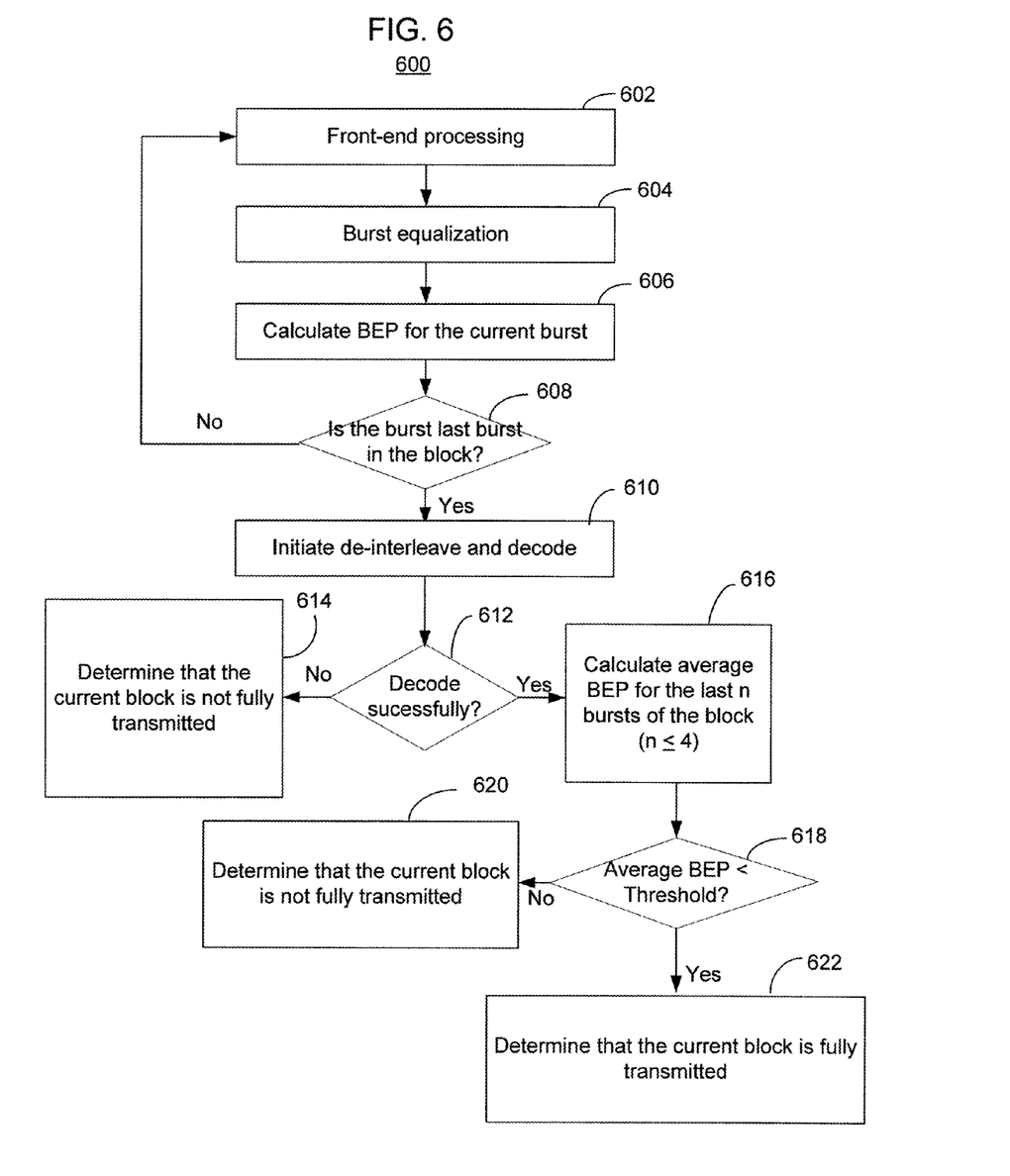
FIG. 6 illustrates another process in accordance with various embodiments of the present invention.

FIG. 6 illustrates a process for processing bursts of a transmission signal block and for determining whether the transmission signal block has been fully transmitted in accordance with various embodiments of the present invention. For the embodiments, the process 600 may be performed as bursts of the transmission signal block is being received and may begin when front-end processing such as digital processing is performed on a burst of the transmission signal block at 602. The burst may then be equalized at 604 and a BEP for the burst may be calculated at 606. The calculation of the BEP for the burst may be as a result of calculating a BEP for the time increment that corresponds to that burst. A determination is then made as to whether the current burst is the last burst of the transmission signal block at 608. If it is not the last burst of the transmission signal block then front-end processing 602, burst equalization 604, and calculation of a BEP 606 may be repeated for the next burst of the transmission signal block.

On the other hand, if the current burst is indeed the last burst of the transmission signal block, then a de-interleaving and a decoding process may at least be initiated for the bursts of the transmission signal block at 610. After the de-interleaving and decoding processes, a determination may then be made as to whether the decoding of the bursts was successful at 612. If the bursts were not successfully decoded, then it is determined that the current transmission signal block was not fully transmitted at 614. However, if the bursts were successfully decoded, then an average BEP for the last n bursts of the transmission signal block may be calculated at 616 (average on the BEPs calculated at 606). In some embodiments, n may be less than or equal to four.

After the average BEP has been calculated, the average BEP may be compared to a threshold at 618. If the average BEP is greater than the threshold, then the transmission signal block is determined to be not fully transmitted at 620. On the other hand, if the average BEP is less than the threshold, then the transmission signal block is determined to be fully transmitted at 622. Note that in alternative embodiments, for example for half-rate communications, two average BEPs may be calculated for the last n bursts and the m bursts preceding the last n bursts, and the two average BEPS may be compared to two thresholds in order to determine whether the transmission signal block was fully transmitted similar to the process 400 illustrated in FIG. 4.

In accordance with various embodiments of the present invention, the determination of whether the transmission signal block was or was not fully transmitted may facilitate the execution of a subsequent process. For example, such a subsequent process may include transmitting BEP data to a base station of a wireless network that is derived or calculated at least in part from a BEP measurement of the transmission signal block if the transmission signal block was determined to be a fully transmitted transmission signal block, or transmitting BEP data to the base station that is calculated or derived without using a BEP measurement of the transmission signal block if the transmission signal block was determined to be a not fully transmitted transmission signal block.

According to various embodiments of the present invention, the BEP data reported back to the base station may be derived or calculated in a number of different ways. For example, one approach may be to report back to the base station, periodically, BEP data containing a long term BEP average of a number of fully transmitted transmission signal blocks. The long term BEP average may be calculated from the average BEPs calculated for a number of fully transmitted transmission signal blocks (e.g., from 26 fully transmitted transmission signal blocks). In this approach, each of the average BEPs calculated for each of the fully transmitted transmission signal blocks may be the average BEP calculated for the last four bursts of each fully transmitted transmission signal block. In a second approach, BEP data may be reported back to the base station after every fully transmitted transmission signal block has been received. In this approach, the BEP data reported back to the base station may include weighted average of BEPs of a fully transmitted transmission signal block belongs to a certain history. The BEPs on which weighted average is done is calculated on the last four bursts of a fully transmitted block like in the first approach. In other embodiments, other alternative approaches may be used to derive the BEP data to be reported back to the base station.

Figure 7:
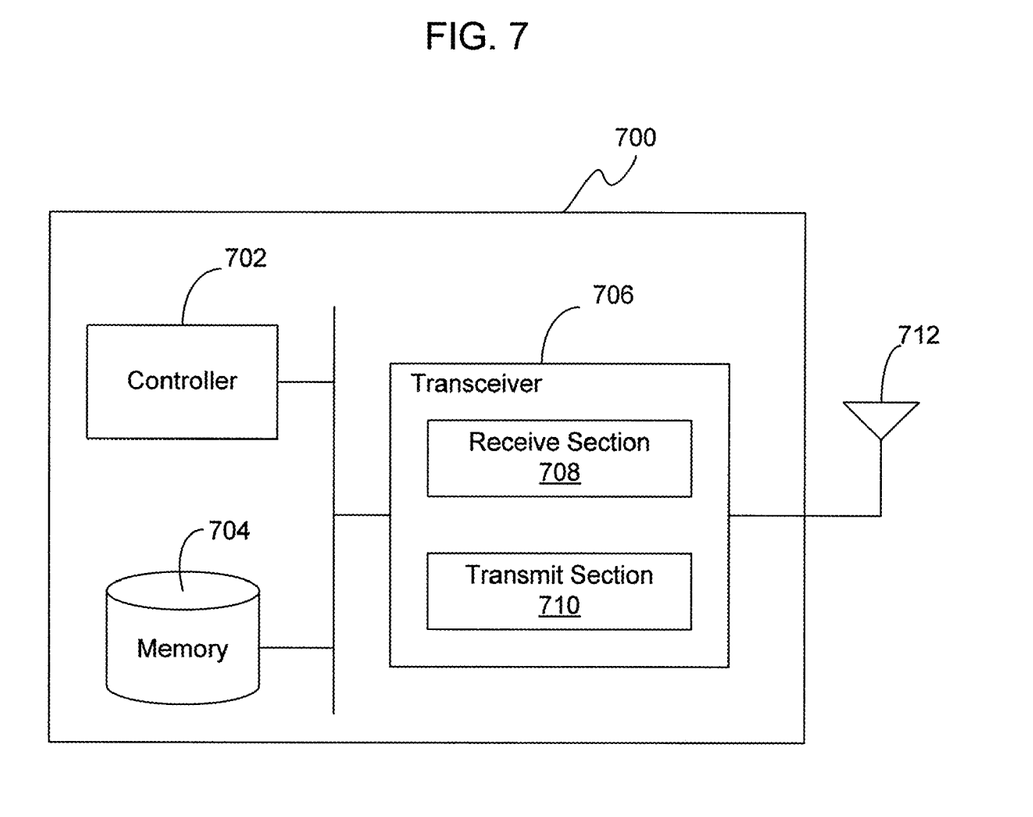
FIG. 7 illustrates a system in accordance with various embodiments of the present invention.

FIG. 7 illustrates a system in accordance with various embodiments of the present invention. For the embodiments, the system 700 may be designed to perform the various processes (i.e., processes 300, 400, and/or 600) described previously. In particular, the system 700, among other things, may at least determine whether a transmission signal block has been fully transmitted by a device of a wireless network. In some embodiments, the device transmitting the transmission signal block may be a base station while the system 700 may be a mobile station or may be hosted by a mobile station of the wireless network. The system 700 may have various form factors including, for example, a cellular telephone, a PDA, a tablet computer, a laptop computer, and so forth. As depicted, the system 700 includes a controller 702, a memory 704, a transceiver 706 including a receive section 708 and a transmit section 710, and an antenna 712, coupled together as shown.

The controller 702 may be a microcontroller, a processor, and so forth. The memory 704 may be a physical storage medium such as volatile and/or persistent memory, or an article of manufacture in forms of a hard disk, CD, or any computer readable medium, and may store instructions designed to program the system 700 to enable the system 700 to perform various functions as will be described below. The receive section 708 of the transceiver 706 may be designed to, for example, receive transmission signal blocks while the transmit section 710 may be designed to, for example, transmit BEP data. The antenna 712 may be an omnidirectional antenna, a directional antenna, a dipole antenna, or other types of antenna.

The components of the system 700 may be adapted to function cooperatively in order to execute the processes described previously (i.e., processes 300, 400, and 600). For example, in various embodiments, the transceiver 706, and in particular, the receive section 708 of the transceiver 706 may be adapted to receive for the system 700 a plurality of bursts of a transmission signal block from a device of a wireless network during a plurality of time increments, if the plurality of bursts were correspondingly transmitted by the device during the plurality of time increments. In some embodiments, the receive section may be adapted to transmit BEP data relating to transmission signal blocks as described previously.

The controller 702 may be adapted to calculate for the system 700 one or more bit error probabilities for the last one or more bursts of the transmission signal block to be transmitted in the one or more of corresponding time increments. The controller 702 may further be adapted to determine for the system 700 whether the transmission signal block was fully transmitted based at least in part on the results of the calculation of the one or more bit error probabilities. In order to make such a determination, the controller 702 may calculate one or more average BEPs based on the one or more bit error probabilities calculated, and to compare the average BEPs to one or more thresholds to determine whether the transmission signal block was fully transmitted as described previously. The controller 702 may also be further adapted to facilitate the implementation of various signal processing operations previously described such as decoding, deciphering, and equalization of received signals.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
receiving by a first device of a wireless network a plurality of bursts of a transmission signal block transmitted by a second device during a plurality of time increments;
calculating by the first device a bit error probability for each of n time increments, where n is an integer and the n time increments are time intervals in which a last n bursts of the transmission signal block are expected to occur;
calculating by the first device an average bit error probability based on the bit error probabilities for the n time increments;
comparing by the first device the average bit error probability to a threshold;
determining that the transmission signal block was fully transmitted by the second device based at least in part on the results of said comparing; and
transmitting to the second device bit error probability data derived at least in part from the transmission signal block.

2. The method of claim 1, wherein n equals four, and said calculating comprises calculating a bit error probability for each of the last four bursts.

3. The method of claim 1, wherein said determining is by comparing the calculated average bit error probability to a threshold, and if the average bit error probability is less than the threshold, determining that the transmission signal block was fully transmitted by the second device, otherwise determining that the transmission signal block was not fully transmitted by the second device.

4. The method of claim 3, wherein said comparing comprises comparing the calculated average bit error probability to a threshold having a value of between 0.25 and about 0.29, and if the average bit error probability is below the threshold, determining that the transmission signal block was fully transmitted by the second device, otherwise determining that the transmission signal block was not fully transmitted by the second device.

5. The method of claim 1 further comprising another calculating of another one or more bit error probabilities for the m bursts to be in the m corresponding time increments preceding said n time increments, where m is an integer, and said determining is further based at least in part on the results of said another calculating.

6. The method of claim 5, wherein said n and said m each equals two.

7. The method of claim 6, further comprising calculating an average bit error probability by averaging the one or more bit error probabilities calculated for the last two bursts, and calculating another average bit error probability by averaging the another one or more bit error probabilities calculated for the two bursts preceding the last two bursts, and said determining comprises determining based at least in part on the two average bit error probabilities.

8. The method of claim 7, wherein said determining is by comparing said average bit error probability to a first threshold and comparing said other average bit error probability to a second threshold, and if the average bit error probability is less than the first threshold or if the other average bit error probability is less than the second threshold then determining that the transmission signal block was fully transmitted by the second device, otherwise determining that the transmission signal block was not fully transmitted by the second device.

9. The method of claim 1, further comprising initiating a decoding process to decode said transmission signal block, and determining whether said transmission signal block was successfully decoded to facilitate said determination of whether the transmission signal block was fully transmitted by the second device.

10. An article of manufacture, comprising:
a physical storage medium; and
a plurality of executable instructions stored in the physical storage medium designed to program a first device of a wireless network to enable the first device to:
receive a plurality of bursts of a transmission signal block transmitted by a second device during a plurality of time increments,
calculate by the first device a bit error probability for each of n time increments, where n is an integer and the n time increments are time intervals in which last n bursts of the transmission signal blocks are expected to occur;
calculate by the first device an average bit error probability based on the bit error probabilities for the n time increments;
compare by the first device the average bit error probability to a threshold;
determine that the transmission signal block was fully transmitted by the second device based at least in part on the results of said compare;
transmit bit error probability data derived at least in part form said transmission signal block to the second device.

11. The article of claim 10, wherein said instructions are adapted to enable said first device subsequent to said calculate to equalize by the first device the received plurality of bursts.

12. The article of claim 10, wherein said instructions are adapted to enable said first device to receive a plurality of interleaved bursts of a transmission signal block.

13. An apparatus, comprising:
a transceiver to receive for a device hosting the apparatus a plurality of bursts of a transmission signal block transmitted by a device of a wireless network during a plurality of time increments; and
a controller coupled to the transceiver to calculate for the host device a bit error probability for each of n time increments, where n is an integer and the n time increments are time intervals in which a last n bursts of the transmission signal block are expected to occur, to calculate an average bit error probability based on the bit error probabilities for the n time increments, to compare the average bit error probability to a threshold, to determine for the host device that the transmission signal block was fully transmitted by the device of the wireless network based at least in part on the results of said comparison, and to transmit to the device of the wireless network bit error probability data derived at least in part from the transmission signal block.

14. The apparatus of claim 13, wherein n equals four, and said controller is adapted to calculate a bit error probability for each of the last four bursts.

15. The apparatus of claim 13, wherein said controller is adapted to perform said determine by comparing the calculated average bit error probability to a threshold, and the controller is further adapted to determine that the transmission signal block was fully transmitted by the other device, if the average bit error probability is less than the threshold, otherwise determine that the transmission signal block was not fully transmitted by the other device.

16. The apparatus of claim 15, wherein said controller is adapted to perform said compare by comparing the calculated average bit error probability to a threshold having a value of between 0.25 and 0.29, and the controller is further adapted to determine that the transmission signal block was fully transmitted by the other device, if the average bit error probability is below the threshold, otherwise determine that the transmission signal block was not fully transmitted by the other device.

17. The apparatus of claim 13, wherein said controller is adapted to calculate another one or more bit error probabilities for the m bursts to be in the m corresponding time increments preceding said last n corresponding time increments, where m is an integer, and said controller is adapted to perform said determine based at least in part on the results of said other calculate.

18. The apparatus of claim 17, wherein said n and said m each equals two, and said controller is further adapted to calculate a bit error probability for each of the last two bursts, to calculate a bit error probability for each of the two bursts preceding the last two bursts, to calculate an average bit error probability by averaging the one or more bit error probabilities calculated for the last two bursts, to calculate another average bit error probability by averaging the another one or more bit error probabilities calculated for the two bursts preceding the last two bursts, and said controller is adapted to perform said determine based at least in part on the two average bit error probabilities.

19. The apparatus of claim 18, wherein said controller is adapted to perform said determine by comparing said average bit error probability to a first threshold and comparing said other average bit error probability to a second threshold, and the controller is further adapted to determine that the transmission signal block was fully transmitted by the other device, if the average bit error probability is less than the first threshold or if the other average bit error probability is less than the second threshold, otherwise determine that the transmission signal block was not fully transmitted by the other device.

20. A system, comprising:

a transceiver to receive for the system a plurality of bursts of a transmission signal block transmitted by a device of a wireless network during a plurality of time increments;

a controller coupled to the transceiver to calculate for the system a bit error probability for each n time increments, where n is an integer and the n time increments are time intervals in which a last n bursts of the transmission signal block are expected to occur, to calculate an average bit error probability based on the bit error probabilities for the n time increments, to compare the average bit error probability to a threshold, to determine for the system that the transmission signal block was fully transmitted by the device of the wireless network based at least in part on the results of said comparison, and to transmit to the device of the wireless network bit error probability data derived at least in part from the transmission signal block; and an omnidirectional antenna coupled to the transceiver.

21. The system of claim 20, wherein the controller is adapted to calculate bit error probability data calculated at least in part from the transmission signal block if the controller determines that the transmission signal block is fully transmitted by the other device, and the transceiver is adapted to transmit to the other device the bit error probability data.

22. The system of claim 20, wherein the system is one selected from the group consisting of a cellular telephone, a personal digital assistant, computing tablet, and a laptop computer.

* * * * *